(12) United States Patent
Shpiro

(10) Patent No.: US 10,061,280 B2
(45) Date of Patent: Aug. 28, 2018

(54) CONTROLLED POWER ADAPTER AND CABLE

(71) Applicant: ADVANCED MAGNETIC SOLUTIONS LIMITED, Wanchai (HK)

(72) Inventor: Zeev Shpiro, Tel-Aviv (IL)

(73) Assignee: ADVANCED MAGNETIC SOLUTIONS LIMITED, Wanchai (HK)

( * ) Notice: Subject to any disclaimer, the term of this patent is extended or adjusted under 35 U.S.C. 154(b) by 0 days.

(21) Appl. No.: 15/730,869

(22) Filed: Oct. 12, 2017

(65) Prior Publication Data

US 2018/0032044 A1 Feb. 1, 2018

Related U.S. Application Data

(63) Continuation-in-part of application No. 15/328,279, filed as application No. PCT/IL2015/050755 on Jul. 22, 2015.

(60) Provisional application No. 62/027,270, filed on Jul. 22, 2014.

(51) Int. Cl.
  *G05B 15/02* (2006.01)
  *G06F 1/26* (2006.01)
  *H01R 13/66* (2006.01)
  *H02J 1/08* (2006.01)
  *H02J 1/06* (2006.01)

(52) U.S. Cl.
  CPC ............ *G05B 15/02* (2013.01); *G06F 1/266* (2013.01); *H01R 13/665* (2013.01); *H02J 1/06* (2013.01); *H02J 1/08* (2013.01)

(58) Field of Classification Search
  None
  See application file for complete search history.

(56) References Cited

U.S. PATENT DOCUMENTS

| | | | |
|---|---|---|---|
| 6,541,879 B1 | 4/2003 | Wright | |
| 2007/0230227 A1* | 10/2007 | Palmer | H02J 7/0004 363/78 |
| 2008/0309313 A1* | 12/2008 | Farrar | G06F 1/266 323/351 |
| 2010/0280676 A1* | 11/2010 | Pabon | G06F 1/266 700/295 |
| 2011/0239008 A1 | 9/2011 | Lam et al. | |

(Continued)

FOREIGN PATENT DOCUMENTS

| CN | 201247888 Y | 5/2009 |
|---|---|---|
| CN | 203260868 U | 10/2013 |

*Primary Examiner* — Jared Fureman
*Assistant Examiner* — Joel Barnett
(74) *Attorney, Agent, or Firm* — Browdy and Neimark, PLLC

(57) ABSTRACT

Embodiments of the present invention comprise systems and methods for providing power from DC output ports, typically smart ports, to electronic devices, not necessarily having smart input DC ports. A power adapter cable is provided comprising a control unit that adapts between a smart output port and a DC input port that may not be compatible with the smart output port. Also provided embodiments of a power adapter hub wherein the power supplied through its output ports is selectively reduced in the case of overload, according to a predefined policy.

14 Claims, 6 Drawing Sheets

(56) References Cited

U.S. PATENT DOCUMENTS

| | | |
|---|---|---|
| 2012/0064772 A1* | 3/2012 | Pocrass ................ H02J 7/0042 |
| | | 439/625 |
| 2012/0071215 A1* | 3/2012 | Bourque ................ G06F 1/266 |
| | | 455/573 |
| 2012/0081067 A1* | 4/2012 | Burrell, IV ........ H01R 13/7175 |
| | | 320/107 |
| 2013/0132758 A1 | 5/2013 | Shiba |
| 2014/0239886 A1* | 8/2014 | Lalitnuntikul .......... G06F 1/266 |
| | | 320/107 |
| 2015/0115897 A1 | 4/2015 | Hsu et al. |

* cited by examiner

CONTROLLED POWER ADAPTER AND CABLE

FIELD OF THE INVENTION

The present invention relates generally to power supplies, and more particularly, to methods and systems for matching between DC output ports and DC input ports.

BACKGROUND OF THE INVENTION

Powering electronic devices typically employ smart output ports. However, there is a need in the art to efficiently match between such output ports and non-compatible DC input ports.

Furthermore, there is a need in the art to optimally handle situations of overload in power adapter hubs, so as to minimally affecting electronic devices connected thereto.

SUMMARY OF THE INVENTION

Accordingly, it is a principal object of the present invention to provide improved methods and systems for efficient delivery of power between smart output ports of powering devices and input ports of electronic devices.

In accordance with an embodiment of the present invention, there is provided a power adapter cable comprising an electrical cable comprising two or more electrical wires; a first interface coupled to a first end of the electrical cable and adapted to connect to a smart output port of a power source; a second interface coupled to a second end of the electrical cable and adapted to connect to a DC input port of an electronic device; and a control unit operatively coupled to the electrical cable in-between the first and second ends thereof and configured to transfer to the power source a power control indication comprising one or more operating parameters related to the DC input port of the electronic device, so as to allow the power source to transfer power with appropriate parameters to the electronic device through the two or more electrical wires.

In some embodiments the power control indication is based on pre-configuration of the control unit.

In some embodiments the control unit comprises a user-interface (UI) adapted to receive user control information, and the power control indication is based on said user control information. The UI may comprise an adjustment means for determining the control information and a visual indication configured to reflect the control information determined by the user. In other embodiments the UI comprises a wireless interface.

In some embodiments the control unit is further coupled to the second interface and further configured to receive from the DC input port of the electronic device, through the second interface, power control information and to produce the power control indication accordingly. In some embodiments the control unit is configured to receive the power control information through at least one data line comprised in the second interface. In other embodiments the control unit is configured to receive the power control information through a DC voltage line comprised in the second interface.

In some embodiments the control unit is configured to transfer to the power source the power control indication through at least one data line comprised in the first interface.

In some embodiments the control unit is configured to transfer to the power source the power control indication through a DC voltage line comprised in the first interface.

In some embodiments the one or more operating parameters related to the DC input port of the electronic device is selected from the group of operating parameters comprising DC voltage, allowed DC voltage range and maximum supply current.

In some embodiments the control unit is further configured to allow power transfer from the first interface, through the two or more electrical wires, to the second interface, only after the power source has responded to the power control indication.

In some embodiments the first and second interfaces comprises one or more characteristics of at least one of the group of power interface specifications comprising Universal Serial Bus (USB) Power Delivery (PD), USB 3.x, USB-C, Quick Charge (QC) and Battery Charging (BC).

In accordance with an embodiment of the present invention, there is further provided a method for controlling power transfer to a DC input port of an electronic device, comprising the steps of providing a power adapter cable as above to be connected between a smart output port of a power source and the DC input port of the electronic device and transferring from the control unit to the power source, through the two or more electrical wires, the first interface and the smart output port, a power control indication comprising one or more operating parameters related to the DC input port of the electronic device, so as to allow the power source to transfer power with appropriate parameters to the electronic device through the two or more electrical wires.

In accordance with an embodiment of the present invention, there is further provided a power adapter hub comprising an AC input port; a power supply circuit coupled to the AC input port for receiving AC power and having a maximum rated output power; and a plurality of output ports coupled to the power supply circuit for supplying DC power therethrough to external devices, wherein the power supply circuit is configured, upon realizing that the total power supplied through the output ports tends to exceed the maximum rated output power (overload), to reduce the power supplied through each of the output ports in a port specific amount selected from a range of zero to full port shutdown, and to continue supplying non-overloaded power.

In some embodiments the predefined policy determines the amount of power reduction in an output port to be inversely related to the susceptibility of the external device connected thereto to such reduction. The power supply circuit may be configured, upon resorting to reducing power to external devices that are substantially susceptible to power reduction, to successively shut down one or more output ports according to a predefined priority policy.

In some embodiments the power supply circuit is further configured to issue alarm indications related to the ports that are shut down.

In some embodiments the power supply circuit is configured to reduce the power supplied through an output port by reducing the supplied current without substantially affecting the output port voltage.

In some embodiments the plurality of output ports comprise smart interfaces that comply with one or more characteristics of at least one of the group of power interface specifications comprising Universal Serial Bus (USB) Power Delivery (PD), USB 3.x, USB-C, Quick Charge (QC) and Battery Charging (BC).

In accordance with an embodiment of the present invention, there is further provided a method for controlling DC power supplied by a power adapter hub as above, comprising the steps of supplying through the output ports the power required by the external devices as far as the total supplied power does not exceed the maximum rated output power; and upon detecting that total power supplied through the output ports tends to exceed the maximum rated output power (overload), reducing the power supplied through each of the output ports in a port specific amount selected from a range of zero to full port shutdown, based on a predefined policy, and continuing to supply non-overloaded power.

In accordance with an embodiment of the present invention, there is further provided a power supply system comprising a power adapter hub as above and at least one power adapter cable as above connected to one of the smart output ports of the power adapter hub.

These and other features and benefits of the invention disclosed herein will be more fully understood upon consideration of the following description and the accompanying drawings.

DETAILED DESCRIPTION OF EMBODIMENTS

Figure 1A:
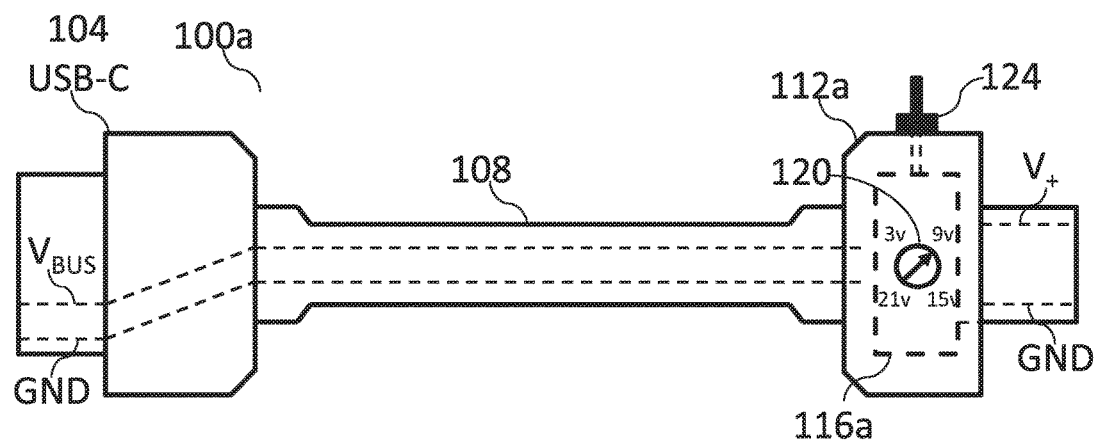
FIGS. 1A, 1C, 1E and 1G are illustrations of power adapter cables, in accordance with an embodiment of the present invention.

Embodiments of the present invention provide improved methods and systems for powering electronic devices by smart DC power sources. The embodiments described hereinafter comprise power adapter cables, power adapter hubs and a system combining both hub and cables, in accordance with an embodiment of the present invention Referring to FIG. 1A there is shown an illustration of a power adapter cable 100a in accordance with an embodiment of the present invention. At one end of the power adapter cable there is an interface connector 104, which comprises a smart USB-C type connector for connecting to a compatible smart output port of a DC power source (not shown in FIG. 1A). Interface 104 is connected to a first end of an electrical cable 108 comprising several electrical wires including, as depicted in FIG. 1A, at least ground and a DC voltage wire, denoted $V_{BUS}$ in USB terms. The electrical wires are typically isolated. At the second end of electrical cable 108 there is connected an interface connector 112a which comprises a simple two wire DC power plug, for connecting to a simple DC input port of an electronic device (not shown in FIG. 1A).

Plug 112a comprises a control unit 116a connected to electrical cable 108 wires and to pins $V_+$ and GND of plug 112a. Control unit 116a, hereinafter described in detail, may be attached to power adapter cable 100a anywhere in-between its ends. Control unit 116a serves for adjusting the DC voltage coming through interface 104, to fit the external device to be connected to interface 112a. In an embodiment, this adjustment can be carried out by a user by means of a mechanical regulator 120 and a button switch 124, as explained below. Mechanical regulator 120 and button switch 124 thus comprise a User Interface (UI) for adjusting $V_{BUS}$. In some embodiments, other UI types may be employed such as a touch screen or a remote controller communicating with control unit 116a through a wireless interface. Through such more advanced UI, control unit 116a can obtain more complex user control information for affecting several operating parameters of the DC input port of the electronic device connected to interface 112a, such as allowed DC voltage range and maximum supply current.

Figure 1B:
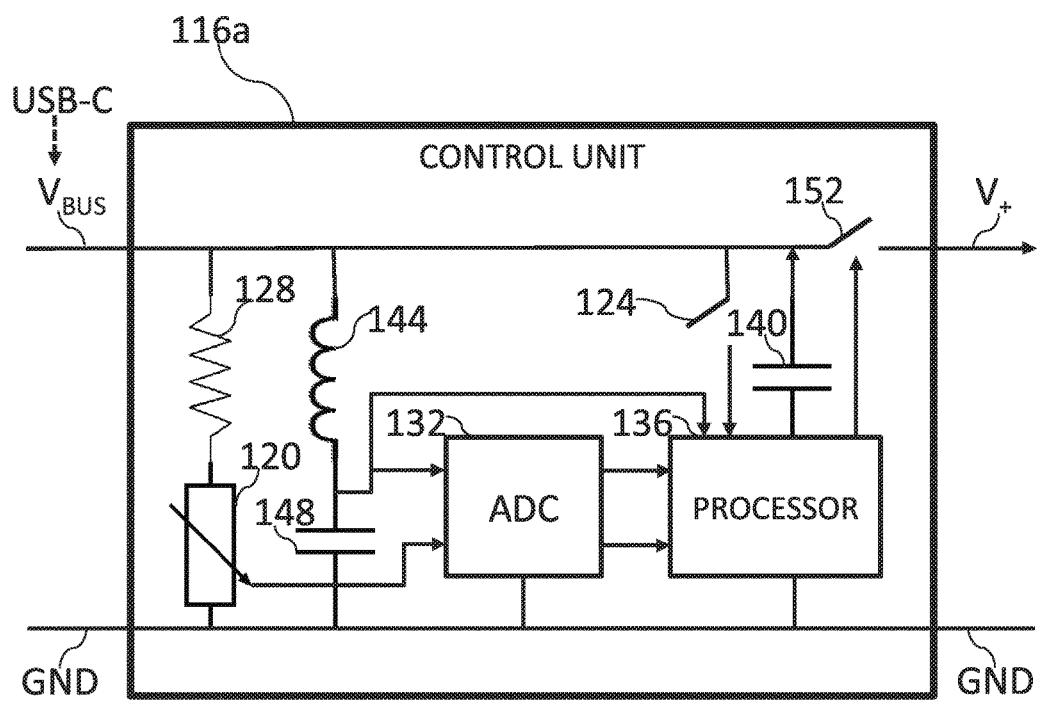
FIGS. 1B, 1D, 1F and 1H are block diagrams that schematically illustrate control units, in accordance with an embodiment of the present invention.

FIG. 1B shows a block diagrams that schematically illustrates a control unit 116a, in accordance with an embodiment of the present invention. As shown in the figure, regulator 120 comprises a potentiometer connected to $V_{BUS}$ through a resistor 128. An Analog to Digital Converter ADC 132 is connected to the potentiometer output and to line $V_{BUS}$ and thereby provides a processor 136 with numerical values that represent the desired and the actual $V_{BUS}$ values respectively. Processor 136 generates accordingly a power control indication logical message sent through a coupling capacitor 140 over line $V_{BUS}$ to 104 connector mate. In an embodiment this signal complies with Power Delivery (PD) protocol. In other embodiments, other protocols and interface lines can be used for the power control indication. In an embodiment, processor 136 is configured to condition sending the power control indication on switch 124 being pressed by the user for confirming his/her adjustment operation. An inductor 144 and a capacitor 148 serve for filtering out the DC voltage supplied to ADC 132 and processor 136. Processor 136 waits until the power source responds to the power control indication and then closes a switch 152, thereby allowing power transfer through interface 112 on line $V_+$. In an embodiment, the power source response is carried on the $V_{BUS}$ line as an acknowledge message. In another embodiment processor 136 measures the updated $V_{BUS}$ level through ADC 132 and closes switch 152 if a correct level is measured.

Figure 1C:
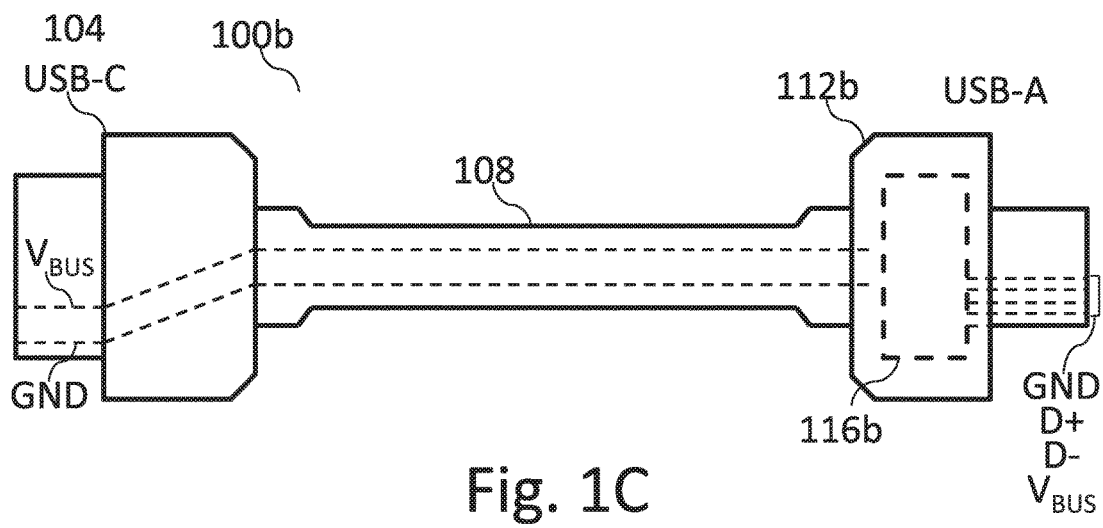

In FIG. 1C there is shown an illustration of a power adapter cable 100b in accordance with an embodiment of the present invention. This cable version differs from 100a in the device side interface 112b, which comprises USB-A connector with D+ and D− lines. Interface 112b does not include external control means and comprises a control unit 116b.

Figure 1D:
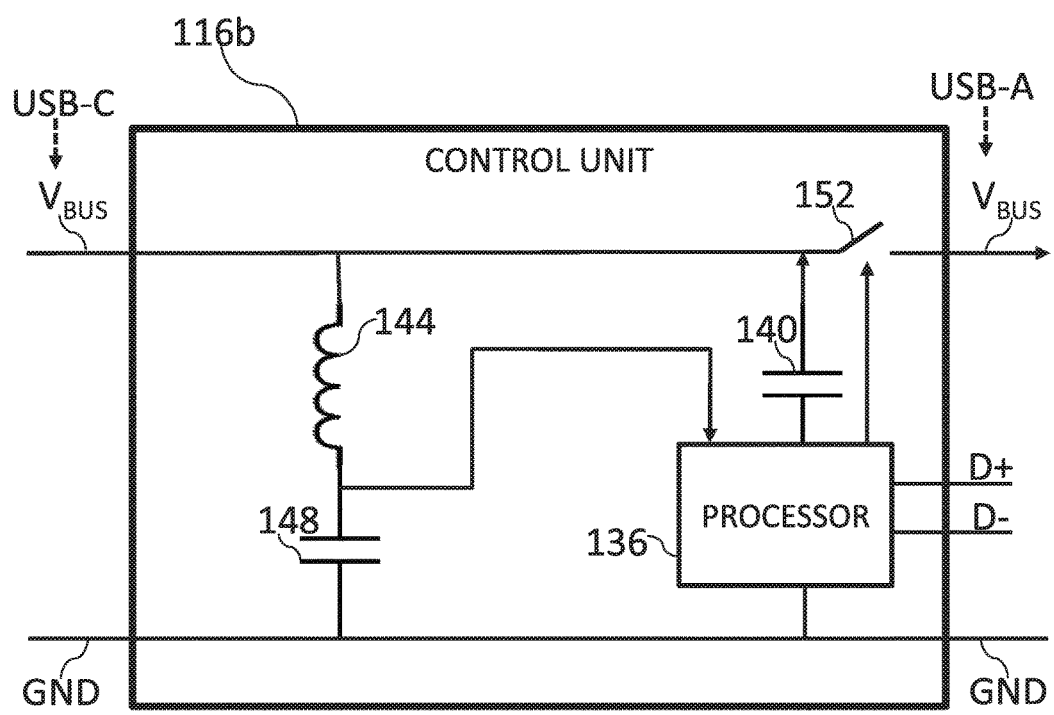

FIG. 1D shows a block diagrams that schematically illustrates a control unit 116b, in accordance with an embodiment of the present invention. It differs from control unit 116a in that processor 136 obtains power control information through lines D+ and D− in interface 112b, which comprises a USB-A plug, rather than from the user. In an embodiment, the power control information conforms to Battery Charge (BC) protocol. In other embodiments, other power control protocols may be employed such as Quick Charge (QC). Yet in other embodiments, processor 136 may receive power control information through line $V_{BUS}$ in the USB-A plug. Yet, as demonstrated in other examples, processor 136 may send power control indication through one or more data lines in interface 104.

Figure 1E:
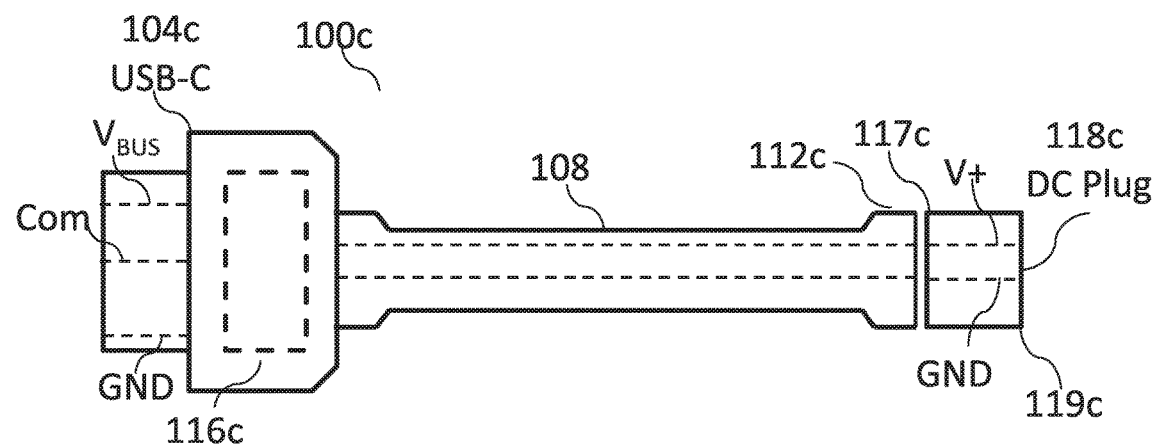

In FIG. 1E illustrates a power adapter cable, 100c, construed in accordance with an embodiment of the present invention. This cable version exemplified in this Fig., differs from cable 100a in the device side interface 112c, which comprises a 2-pin connector and a DC plug 118c that is plugged into the 2-pin connector 112c. There is a plurality of DC plugs 118c, where one end of the DC plug, designated 117c, is connected to the 2-pin connector 112c, whereas the other end of DC plug 118c, designated 119c, varies from one DC plug to the other in its shape and/or form, in order to match different shapes and/or forms of various DC Input ports of electronic equipment. The voltage V+ as well as the maximum current are pre-set at control unit 116c to match the DC plugs output power requirements. The same power level is delivered to each of the multiple DC plugs. The control unit is attached to the USB-C plug 104c. In the USB-C interface of plug 104c, there is an additional communication line, designated "Com", connecting control unit 116c and the smart port of the Power Supply.

Figure 1F:
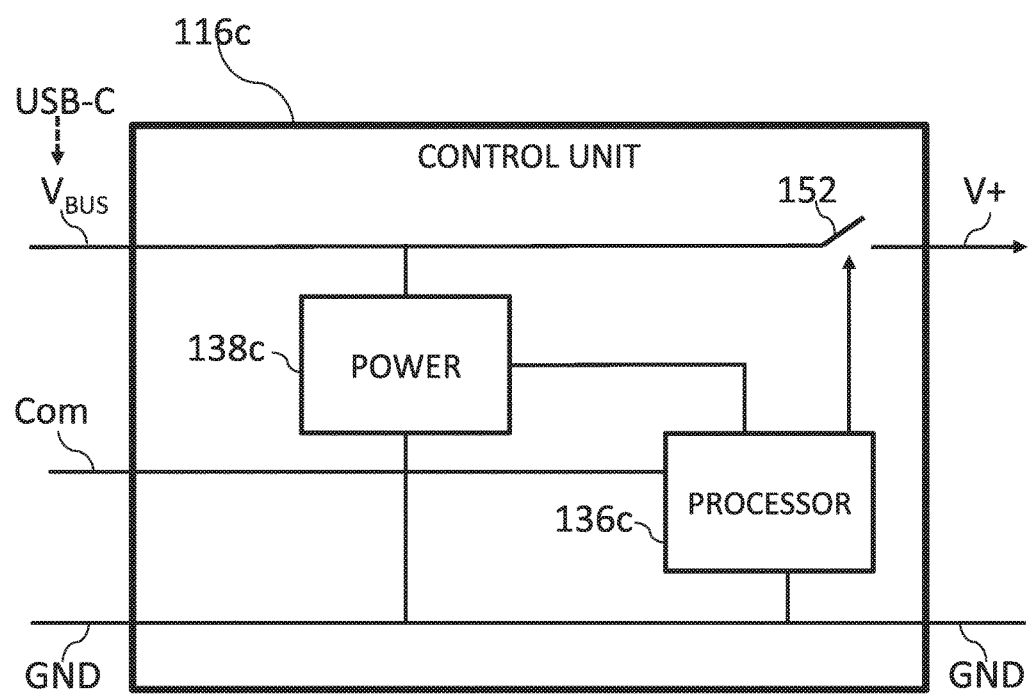

FIG. 1F presents a block diagram that schematically illustrates a control unit, 116c, construed in accordance with an embodiment of the present invention. It may be noted that control unit 116c differs from control unit 116b in that the processor 136 is capable of communicating power control information to the smart port over/through communication line Com, and its power is provided from power circuit 138c, which power is provided from the Vbus. The circuit is used in this example, as the Vbus voltage may change over time (e.g. between 5 and 20 Vdc), whereas processor 136 may require a constant low input voltage (e.g. 5 Vdc). It should be noted that processor 136 and/or power circuit 138 may be integrated circuits, or one single circuit having a plurality of elements.

Figure 1G:
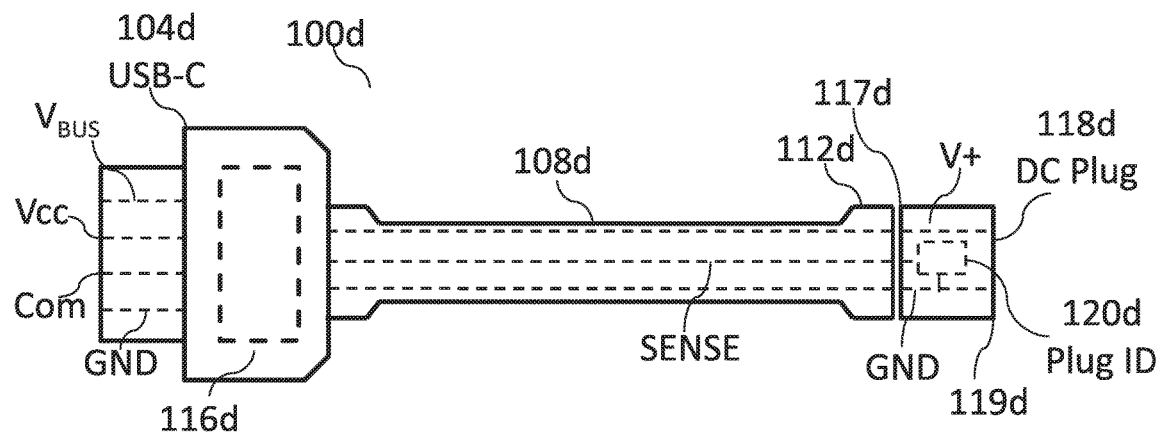

FIG. 1G illustrates another example of a power adapter cable, 100d, construed in accordance with an embodiment of the present invention. The cable version illustrated in this example, differs from cable 100c in that the device side interface 112d comprises a 3-pin connector and a DC plug 118d that is adapted to be plugged into the 3-pin connector 112d. There is a plurality of DC plugs 118d, one end of the DC plug, designated 117d, is connected to the 3-pin connector 112d, whereas the other end 119d varies from one DC plug to the other in its shape and/or form and/or delivered power, in order to match different shapes and/or forms and/or power requirements of DC Input ports of various electronic equipment. The voltage V+, and maximum current for each DC Plug, are set following the DC Plug ID 120d, which is part of the DC Plug 118d. The Plug ID can be for example a resistor or capacitor, where its value serves as the Plug ID. Cable 108d includes 3 wires, where the additional wire is Sense which is used to transfer the DC Plug ID information to control unit 116d. In the USB-C interface 104d, there is an additional power line Vcc for powering the control unit from the smart port of the power supply with a constant voltage (unlike Vbus that may change its voltage over time).

Figure 1H:
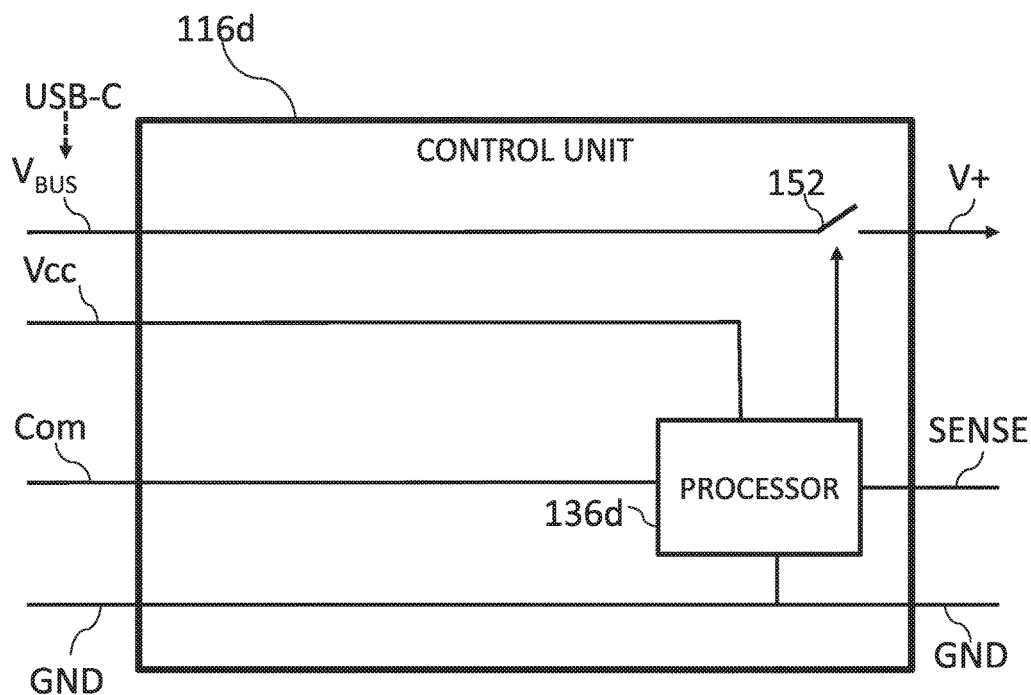

FIG. 1H presents a block diagrams schematically illustrating a control unit 116d, in accordance with an embodiment of the present invention. This control unit differs from control unit 116c in that the processor 136 is powered directly via Vcc line, and receives DC Plug ID information via the Sense line. This information may be converted by processor 136d to power control information that is communicated to the smart port over/through communication line Com.

The above-described examples, exemplify certain ways of implementing the present invention, where each element may be implemented in any one of a several different methods. For example, two types of powering control unit 116 are presented, two different types of communications extending between the control unit and smart port of the power supply, and two types of DC plugs, were described.

As should be obvious to any person skilled in the art, other additional options are available to implement each of the required functionalities, as well as different combinations of elements that may be selected for carrying out the present invention, all of which are encompassed within the scope of the present invention.

In some embodiments the control unit may store a pre-configured control information, alternatively or additionally to the above described control information. In various embodiments of the present invention, interfaces 104, 104c, 104d, 112a and 112b may comprise a selection of characteristics relating to various specifications such as USB Power Delivery (PD), USB 3.x, USB-C, Quick Charge (QC) and Battery Charging (BC).

Figure 2:
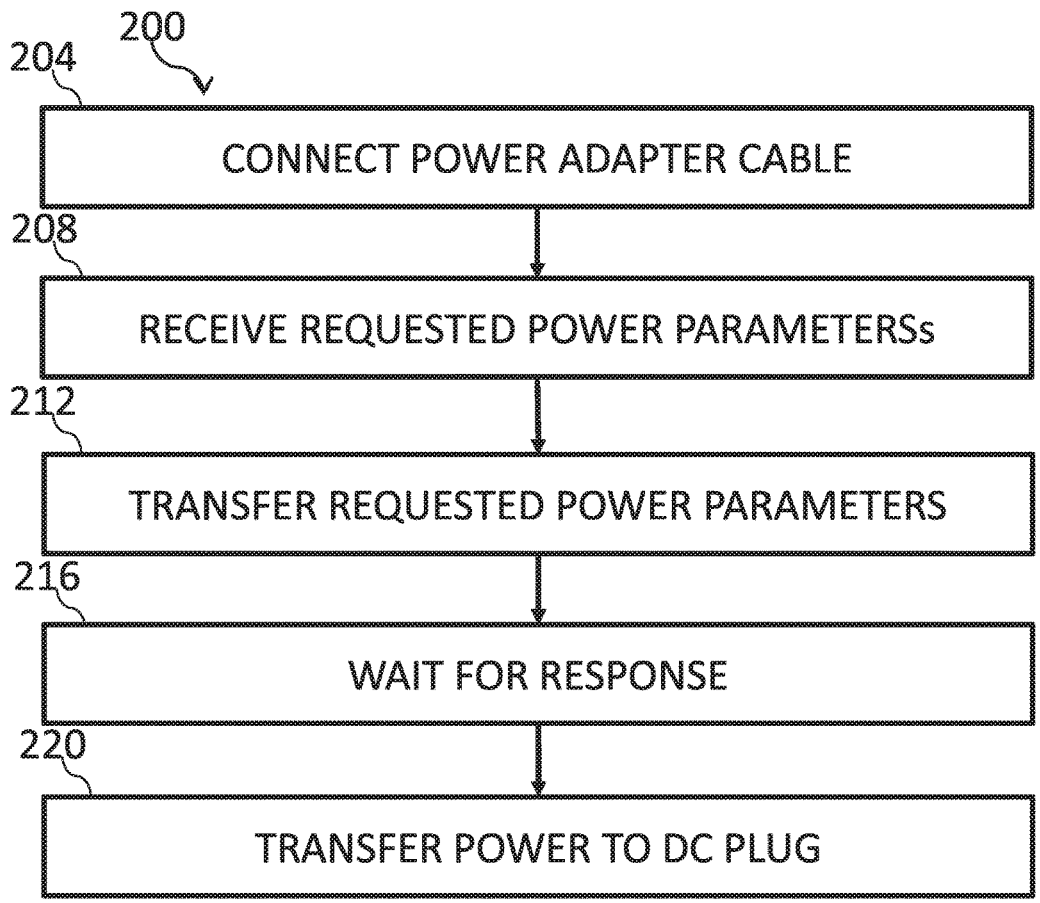
FIG. 2 is a flowchart that schematically illustrates a method for controlling power transfer, in accordance with an embodiment of the present invention.

FIG. 2 shows a flow chart 200 that schematically illustrates a method for controlling power transfer from a smart output port of a DC power source, in accordance with an embodiment of the present invention. The method begins with a connecting step 204, wherein a power adapter cable, such as 100a, 100b, 100c and 100d, is connected between the smart output port and a DC input port of an electronic device. In a receiving step 204, a control unit such as 116a, 116b, 116c and 116d receives control information comprising one or more requested parameters relating to the DC input port. In a transferring step 212, the control unit sends the requested parameters to the smart output port. In a waiting step 216, the control unit waits for the power source response as explained above. In a transferring step 220 the control unit allows DC power transfer to the DC plug.

The waiting step can be implemented in various ways including (but not limited) a predefined time, or delay till receiving indication of the measured Power, or indication from the Smart Port that the request was executed.

Figure 3:
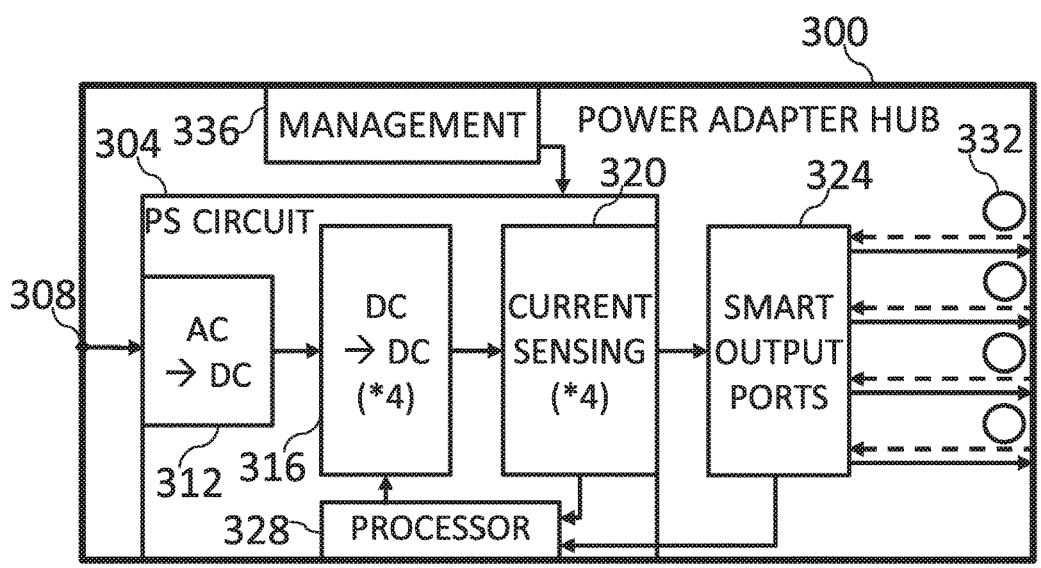
FIG. 3 is a block diagrams that schematically illustrates a power adapter hub, in accordance with an embodiment of the present invention.

FIG. 3 shows a block diagrams that schematically illustrates a power adapter hub 300, in accordance with an embodiment of the present invention. A power path through power adapter hub 300 starts with an AC input port 308. An AC to DC converter 312 produces a stabilized DC voltage that feeds multiple DC to DC converters 316. Converters 316 produce output DC voltages that pass through current sensing units 320 and smart output ports 324. A processor 328 is connected to sensing units 320 and output ports 324 and thereby constantly calculates the overall power consumed by external devices (not shown in FIG. 3) that are powered by output ports 324. The above stages 312, 316, 320 and 328 compose a power supply circuit 304 (PS) for which a maximum rated output power is specified. Processor 328 is also aware of the properties of the external devices, based on power request information exchanged through smart output ports 324. According to those properties, processor 328 infers the susceptibility of each external device to possible reduction in the power supplied thereto.

When processor 328 realizes, based on the overall consumed power, that the maximum rated output power tends to be exceeded, it infers that the PS gets into an "overload" condition and starts controlling it so as to mitigate the overload as hereinafter explained. Indicators 332 are explained hereinafter as well. A management interface 336 serves for remotely monitor and control power adapter hub 300. In various embodiments of the present invention, smart output ports 324 may comprise a selection of characteristics relating to various specifications such as USB Power Delivery (PD), USB 3.x, USB-C, Quick Charge (QC) and Battery Charging (BC).

In addition, it should also be noted, that:
a) The Power Adapter Hub can be fed by a DC source in which case the AC/DC block 312 would not be necessary.
b) The input to the DC/DC converter 316 does not necessarily have to be a stabilized power (the DC/DC convertor may stabilize it).
c) Current sensing 320 may be implemented as part of the smart output ports 324.
d) The tasks assigned to processor 328, may be carried out by implementing distributed controllers embedded in smart output ports 324.

Figure 4:
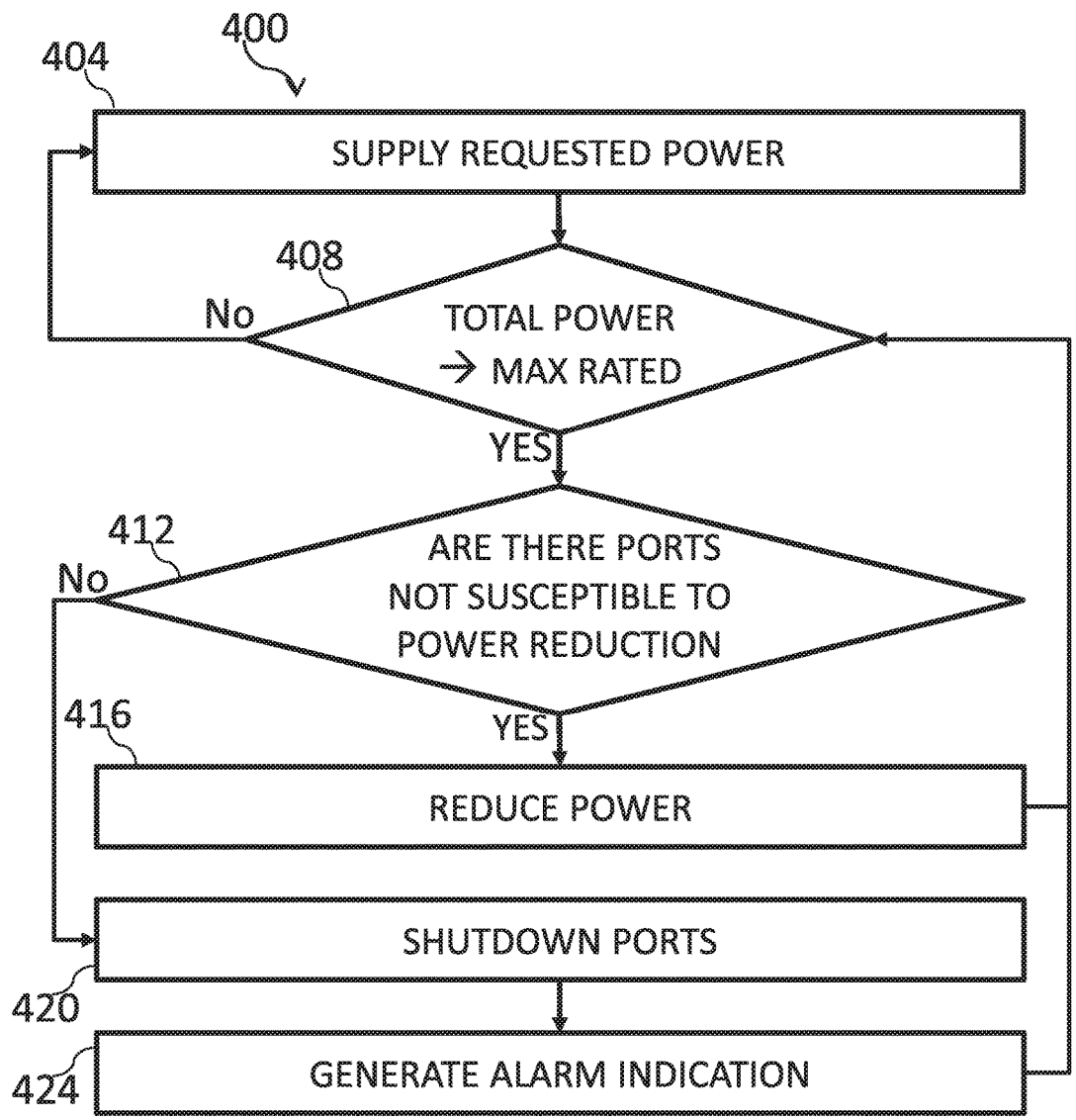
FIG. 4 is a flowchart that schematically illustrates a method for controlling DC power supplied by a power adapter hub, in accordance with an embodiment of the present invention.

FIG. 4 presents a flowchart 400 that schematically illustrates a method for controlling DC power supplied by power adapter hub 300, in accordance with an embodiment of the present invention. The method begins with a supplying step 404, wherein output ports 324 supply output power to the external devices according to their requirements, which are typically requested using power transfer protocols comprised in the above mentioned smart output port specifications. In a decision step 408, processor 328 constantly checks whether PS 304 is overloaded, as explained above. In the case of overload, the method proceeds to a decision step 412 wherein processor 328 instructs DC to DC converters 316 to reduce the power they supply to the external devices according to a predefined priority based policy that takes into account the assessed susceptibility of the external devices to such reduction. In an enablement, the policy starts, in a reducing step 416, to reduce the power supplied to output ports that supply power to charger type external devices, due to their assessed low susceptibility to temporal power reduction. Once no external devices that are substantially not susceptible to power reduction are left, the policy, in a shutdown step 420, starts to successively shut down output ports according to a predefined priority. The method terminates with an issuing step 424 wherein processor 328 issues an alarm indication through indicators 332 for each shut down output port. In some embodiments, some DC to DC converters 316 are configured to reduce the supplied power by reducing the supplied current without substantially affecting the corresponding output port voltage.

Figure 5:
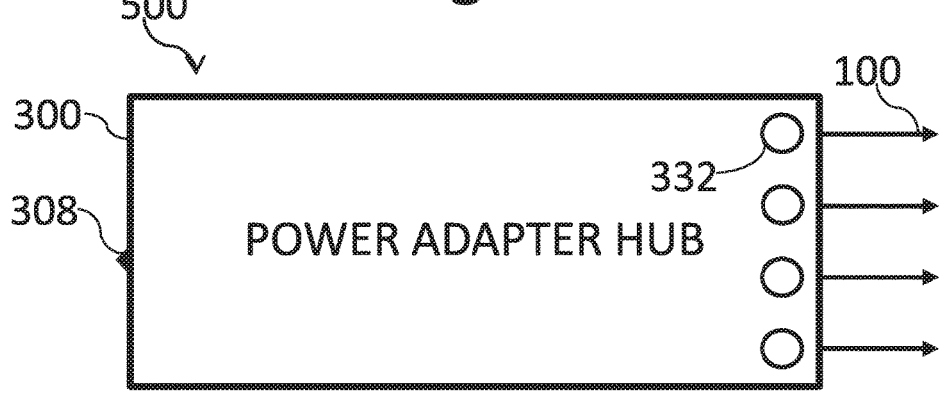
FIG. 5 is a block diagrams that schematically illustrate a power supply system, in accordance with an embodiment of the present invention.

FIG. 5 shows a block diagrams that schematically illustrates a power supply system 500, in accordance with an embodiment of the present invention. The system comprises power adapter hub 300 and one or more power adapter cables such as 100*a*, 100*b*, 100*c* and 100*d*.

The above description has focused on the specific embodiment elements and method steps that are essential for understanding certain features of the disclosed techniques. Detailed structure of the embodiment elements was omitted from the figures and associate description for the sake of simplicity but will be apparent to persons of ordinary skill in the art. The described embodiments and methods shall be referred to as examples, chosen purely for the sake of conceptual clarity. In alternative embodiments, any other suitable configurations and method steps can also be used.

The invention claimed is:

1. A power adapter cable comprising:
an electrical cable comprising two or more electrical wires;
a first interface coupled to a first end of the electrical cable and configured and operable to connect to an output port of a power source that provides power at a level selected from among a plurality of different power levels;
a second interface coupled to a second end of the electrical cable and adapted and operable to connect to a DC input port of an electronic device, wherein said electronic device operates at a power level that corresponds to that of a member of a group that consists of said plurality of different power levels; and
a control unit operatively coupled to the electrical cable in-between the first and second ends thereof, and
wherein said control unit transfers to the power source, through the two or more electrical wires, the first interface and the output port, a power control indication associated with a power level relating to the DC input port of the electronic device, thereby causing the power source to change the power level of its output power being transferred to the electronic device through the two or more electrical wires, to a power level that would satisfy the power requirement of the electronic device once connected to the second interface and in operation.

2. The power adapter cable of claim 1, wherein the control unit comprises a user-interface (UI) that receives user control information, and the power control indication is based on said user control information.

3. The power adapter cable of claim 2, wherein the UI comprises an adjustment element for determining the control information and a visual indication that reflects the control information determined by the user.

4. The power adapter cable of claim 1, wherein the control unit receives from the DC input port of the electronic device, through the second interface, power control information and generates the power control indication in accordance with the power control information.

5. The power adapter cable of claim 1, wherein the control unit receives the power control information through at least one data line comprised in the second interface, or through a DC voltage line comprised in the second interface, or through both.

6. The power adapter cable of claim 1, wherein the control unit transfers the power control indication to the power source, through at least one data line comprised in the first interface.

7. The power adapter cable of claim 1, wherein the control unit further comprises a switch to transfer power to the second interface, only at a power level that would satisfy the power requirement of the electronic device once connected to the second interface and in operation.

8. The power adapter cable of claim 1, wherein at least one of the first and second interfaces comprises one or more characteristics of at least one member of the group of power interface specifications that consists of: Universal Serial Bus (USB) Power Delivery (PD), USB 3.x, USB-C, Quick Charge (QC) and Battery Charging (BC).

9. The power adapter cable of claim 1, wherein said power level comprises at least one member of a group that consists of a) voltage and b) current.

10. The power adapter cable of claim 1, wherein said power adapter cable is configured and operable to connect to one of a plurality of electronic devices having different operating voltage from each other.

11. The power adapter cable of claim 1, wherein a power level of the electronic device corresponds to that of a member of the group that consists of said plurality of different power levels when the power level of the member of the group enables the electronic device to operate.

12. A power adapter cable comprising:
an electrical cable comprising two or more electrical wires;
a first interface coupled to a first end of the electrical cable and configured and operable to connect to an output port of a power source that provides power at a level selected from among a plurality of different power levels;
a second interface coupled to a second end of the electrical cable and configured and operable to connect to a DC input port of an electronic device, wherein said electronic device operates at a pre-defined power level; and
a control unit operatively coupled to the electrical cable in-between the first and second ends thereof, and
wherein said control unit transfers to the power source, through the two or more electrical wires, the first interface and the output port, a power control indication associated with a DC voltage and a current supply relating to the adapter at the second interface, thereby causing the power source to change the power level of its output power being transferred to the adapter at the second interface through the two or more electrical wires, to a power level that would satisfy the power requirement of the electronic device once connected to the second interface and in operation.

13. A method for controlling power transfer to a DC input port of an electronic device configured and operable to operate at a pre-defined power level, wherein said method comprising:
providing a power adapter cable to be connected between an output port of a power source that provides power at a level selected from among a plurality of different power levels, and the DC input port of the electronic device, the power adapter cable comprising: an electrical cable comprising two or more electrical wires, a first interface coupled to a first end of the electrical cable and configured and operable to connect to a smart output port of the power source, a second interface coupled to a second end of the electrical cable and configured and operable to connect to the DC input port of the electronic device, and a control unit operatively coupled to the electrical cable in-between the first and second ends thereof; and
transferring from the control unit to the power source, through the two or more electrical wires, the first interface and the output port, a power control indication associated with a power level relating to the DC input port of the electronic device, thereby causing the power source to change the power level of its output power being transferred to the electronic device through the two or more electrical wires, to a power level that would satisfy the power requirement of the electronic device once connected to the second interface and in operation.

14. A method for controlling power transfer to a DC input port of an electronic device configured to operate at a power level being a member of a group that consists of a plurality of different power levels, wherein said method comprising:
providing a power adapter cable to be connected between an output port of a power source that provides power at a level selected from among a plurality of different power levels and the DC input port of the electronic device, the power adapter cable comprising: an electrical cable comprising two or more electrical wires, a first interface coupled to a first end of the electrical cable and configured and operable to connect to a smart output port of the power source, a second interface coupled to a second end of the electrical cable and configured and operable to connect to the DC input port of the electronic device, and a control unit operatively coupled to the electrical cable in-between the first and second ends thereof; and
transferring from the control unit to the power source, through the two or more electrical wires, the first interface and the output port, a power control indication associated with a power level relating to the adapter at the second interface, thereby causing the power source to change power level of its output power being transferred to the adapter at the second interface through the two or more electrical wires, to a power level that would satisfy the power requirement of the electronic device once connected to the second interface and operational.

* * * * *